United States Patent
Cattoni et al.

(10) Patent No.: US 9,326,292 B2
(45) Date of Patent: Apr. 26, 2016

(54) DISTRIBUTED CONTROL OF CHANNEL SELECTION IN A COMMUNICATION SYSTEM

(75) Inventors: Andrea Cattoni, Nibe (DK); Luis Guilherme Uzeda Garcia, AalbBelo Horizonte (BR); Istvan Zsolt Kovacs, Aalborg (DK); Gustavo Wagner, Aalborg (DK)

(73) Assignee: Nokia Solutions & Networks Oy, Espoo (FI)

( * ) Notice: Subject to any disclaimer, the term of this patent is extended or adjusted under 35 U.S.C. 154(b) by 266 days.

(21) Appl. No.: 14/008,107

(22) PCT Filed: Mar. 29, 2011

(86) PCT No.: PCT/EP2011/053106
§ 371 (c)(1),
(2), (4) Date: Sep. 27, 2013

(87) PCT Pub. No.: WO2012/130269
PCT Pub. Date: Oct. 4, 2012

(65) Prior Publication Data
US 2014/0056250 A1 Feb. 27, 2014

(51) Int. Cl.
*H04B 7/216* (2006.01)
*H04J 3/16* (2006.01)
(Continued)

(52) U.S. Cl.
CPC ............ *H04W 72/08* (2013.01); *H04W 72/082* (2013.01); *H04W 72/02* (2013.01)

(58) Field of Classification Search
CPC ..... H04W 72/02; H04W 72/04; H04W 72/08; H04W 72/082
See application file for complete search history.

(56) References Cited

U.S. PATENT DOCUMENTS

| 7,327,697 | B1 | 2/2008 | Friday et al. | 370/278 |
| 8,498,639 | B2 * | 7/2013 | Chen et al. | 455/434 |

(Continued)

FOREIGN PATENT DOCUMENTS

WO   WO 2009/142954 A1   11/2009

OTHER PUBLICATIONS

IEEE Std 802.11—2007; IEEE Standard for Information Technology—Telecommunications and information exchange between systems—Local and metropolitan area networks—Specific requirements; Part 11: Wireless LAN Medium Access Control (MAC) and Physical Layer (PHY) Specifications, (1,076 pages).

(Continued)

*Primary Examiner* — Dang Ton
*Assistant Examiner* — Ryan Kavleski
(74) *Attorney, Agent, or Firm* — Harrington & Smith

(57) ABSTRACT

Mechanisms for enabling distributed access control are disclosed. At least one communication channel is selected for wireless communication by a device by a selection procedure where interference impact of at least one communication channel on at least one interfered node is determined, an overall interference effect is formed, and a set of feasible communication channels is selected based on comparison of the overall interference effect to communication channel capacity. At least one communication channel can be selected from the selected set of feasible communication channels based on transmission collision information, a ratio of capacity of interfered transmissions and capacity of interference-free transmissions, usage history of the feasible communication channels, and fairness of communication channel selection. Information can be communicated to at least one device from a plurality of access nodes.

8 Claims, 13 Drawing Sheets

(51) Int. Cl.
*H04B 7/00* (2006.01)
*H04W 72/08* (2009.01)
*H04W 72/02* (2009.01)

(56) References Cited

U.S. PATENT DOCUMENTS

2004/0125779 A1* 7/2004 Kelton et al. ................ 370/338
2005/0122999 A1 6/2005 Scherzer et al. .............. 370/480
2009/0103501 A1* 4/2009 Farrag et al. .................. 370/337
2010/0150095 A1* 6/2010 Gandham et al. ............. 370/329

OTHER PUBLICATIONS

Zhu, Chenxi, et al., "A Distributed Channel Probing Scheme for Wireless Networks", © 2001 IEEE, 9 pgs.

* cited by examiner

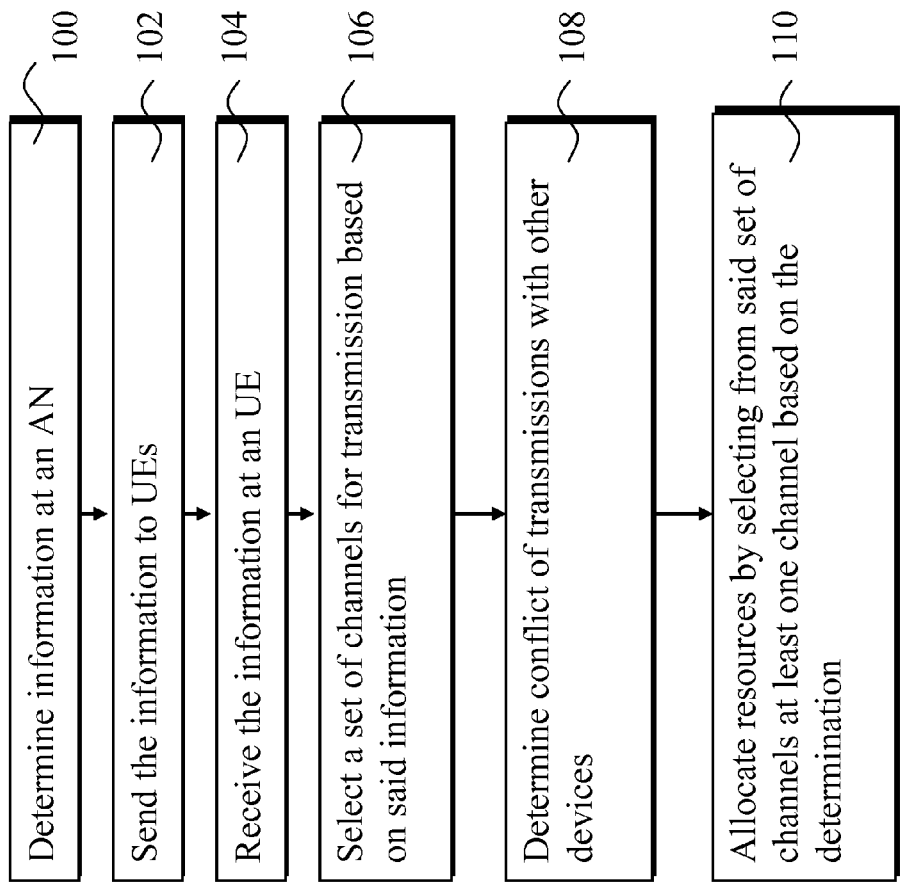
Fig. 4
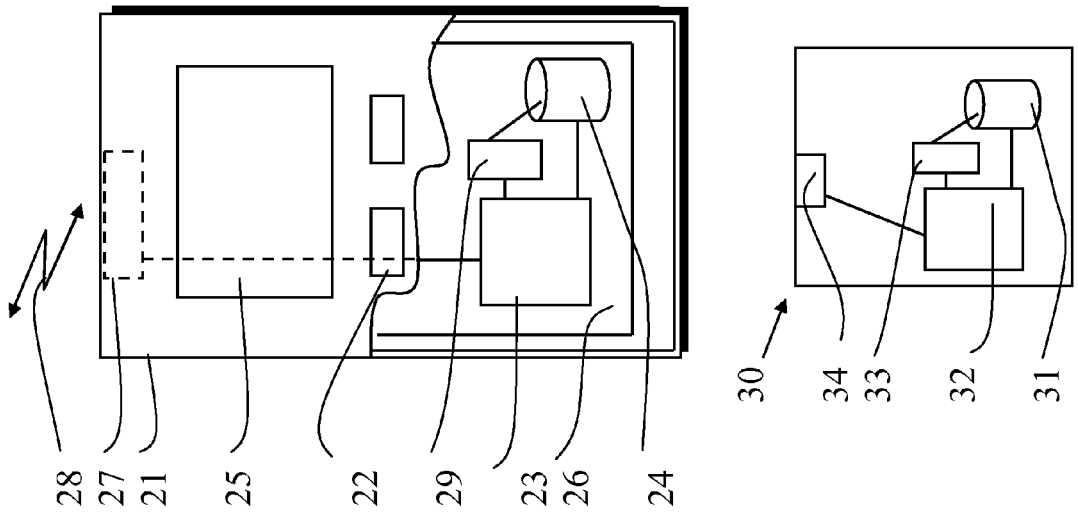
Fig. 2
Fig. 3

DISTRIBUTED CONTROL OF CHANNEL SELECTION IN A COMMUNICATION SYSTEM

This disclosure relates to channel selection for wireless communication, and more particularly to selection of communication channels in a system comprising a multiple of wireless devices.

A wireless system can be seen as a facility that enables communications between two or more wireless devices such as fixed or mobile communication devices, access nodes such as base stations, relay nodes, and/or other devices capable of wireless communication. The system and compatible wireless devices typically operate in accordance with a given standard or specification which sets out what the various entities associated with the system are permitted to do and how that should be achieved. A wireless communication device is provided with an appropriate signal receiving and transmitting arrangement for enabling communication of voice, data and signalling with other parties. A wireless communication device of a user is often referred to as user equipment (UE) or terminal.

Examples of wireless systems include public land mobile networks (PLMN) such as cellular networks, satellite based communication systems and different wireless local networks. Examples of PLMN systems include architectures standardized by the 3rd Generation Partnership Project (3GPP). These include the Universal Mobile Telecommunications System (UMTS) and the long-term evolution (LTE) of the Universal Mobile Telecommunications System (UMTS). A further development of the LTE is often referred to as LTE-Advanced. Examples of wireless local area networks (WLAN) include systems based on IEEE 802.11 standards. Another example is broadband wireless metropolitan area networks, such as those based on IEEE 802.18 standards.

To satisfy ever increasing mobile data traffic demand it would be desired to reduce the size of the cells and increase the spatial density of the access nodes. While this approach enables better coverage and reduction in the number of holes in radio coverage, this can also create a substantially complex interference scenario. This is due to the random deployment of the access nodes, whose location, most of the times, has not been planned or coordinated by operators or otherwise. Examples of possible topologies of this kind include network assisted device to device (D2D) communications, femtocells and other heterogenous networks. The interference patterns caused by these systems can be quite different from those of the cellular networks. These topologies may thus be challenging, especially in terms of interference management.

A radio access node is a key point of such topologies. The multiplexing and multiple access functionalities of an access node can become critical for the performance of the entire network. The access node may have limited complexity, for example in the case of D2D, and therefore advanced functions such as dynamically scheduled multiple access may be prohibitive, and in some applications an overkill solution.

A multiple access (MA) protocol defines how several transmitters can coordinate transmission for a target receiver. Widely used multiple access protocols are based on various channelization techniques, dynamic access (scheduling) techniques, contention-based access, random access (e.g. slotted aloha), and listen before talk type access such as Carrier Sense Multiple Access With Collision Avoidance (CSMA/CA).

Existing multiple access methods may not always provide optimum performance, in particular because of interference. Also, prior art multiple access methods may not provide an efficient distributed access control. For example, slotted aloha may offer a limited channel utilization and therefore overall spectral efficiency is compromised. In CSMA/CA air time may become wasted on contention, and thus efficiency is reduced. Access based on CSMA/CA can also be exposed to hidden terminal problems, and may suffer from fairness and scalability problems, especially on overlapping networks, and of high battery consumption. Dynamically scheduled access over channelization requires centralized and relatively complex decision making algorithms and may thus not be suited for distributed control. A central control require, for multiple access, buffer status reports (causing uplink overhead) and extra scheduling grants (causing downlink overhead). In low loads the round trip time (RTT) for multiple access can be much higher than would be for a simple random access. Furthermore, multi-cell interference management may require extra mechanisms and/or overhead.

It is noted that the above discusses only examples, and the issues are not limited to any particular communication system, standard, specification, radios and so forth, but may occur in any communication device and/or system.

Embodiments of the invention aim to address one or several of the above issues.

In accordance with an embodiment there is provided a method for enabling distributed control of radio access in a communication system serving a plurality of devices capable of wireless communication, the method comprising determining information in relation to radio channel conditions on available communication channels at an access node, and communicating said information to at least one device within the coverage of the access node for use in the distributed control of radio access at the at least one device.

In accordance with an embodiment there is provided a method for selecting a set of feasible communication channels for use in selection of at least one communication channel for wireless communication by a device, comprising evaluating interference impact of at least one communication channel on at least one interfered node, forming an overall interference effect, and selecting the set of feasible communication channels based on comparison of the overall interference effect to communication channel capacity.

In accordance with an embodiment there is provided a method for selecting at least one communication channel for wireless communication by a device, comprising selecting the at least one communication channel from a selected set of feasible communication channels based on transmission collision information, a ratio of capacity of interfered transmissions and capacity of interference-free transmissions, usage history of the feasible communication channels, and fairness of communication channel selection.

In accordance with an embodiment there is provided an apparatus for enabling distributed access control in a system comprising a plurality of devices capable of wireless communication, the apparatus comprising at least one processor, and at least one memory including computer program code, wherein the at least one memory and the computer program code are configured, with the at least one processor, to determine information in relation to radio channel conditions on available communication channels at an access node, and to cause communication of said information to at least one device within the coverage of the access node for use in the distributed control of radio access at the at least one device.

In accordance with an embodiment there is provided an apparatus for selecting a set of feasible communication channels for use in selection of at least one communication channel for wireless communication by a device, the apparatus comprising at least one processor, and at least one memory including computer program code, wherein the at least one memory and the computer program code are configured, with the at least one processor, to evaluate interference impact of at least one communication channel on at least one interfered node, to form an overall interference effect, and to select the set of feasible communication channels based on comparison of the overall interference effect to communication channel capacity.

In accordance with an embodiment there is provided an apparatus for selecting at least one communication channel for wireless communication by a device, the apparatus comprising at least one processor, and at least one memory including computer program code, wherein the at least one memory and the computer program code are configured, with the at least one processor, to select the at least one communication channel from a selected set of feasible communication channels based on transmission collision information, a ratio of capacity of interfered transmissions and capacity of interference-free transmissions, usage history of the feasible communication channels, and fairness of communication channel selection.

In accordance with a yet further embodiment channel selection for communication comprises selection of a set of feasible communication channels and selection of at least one channel for communication from the selected set.

In accordance with a more detailed embodiment the fairness of communication channel selection is determined by means of a mechanism for reducing the probability of selecting an additional communication channel if one or more communication channels have already been selected by the device. The transmission collision information may comprise a long term transmission collision avoidance metric and a short term transmission collision avoidance metric. The usage history of the feasible communication channels may comprise information whether a particular channel has been used or not.

Distributed access control in a system serving a plurality of devices capable of wireless communication comprising selection of at least one communication channel as stated above may also be provided. In this embodiment information relating to radio channel conditions is provided by and/or received from at least one node of the system, interference is managed by selecting the set of communication channels based on said received information, and the device allocates communication resources by selecting at least one communication channel from the set of channels for communication with an access node.

Information about interference on at least one communication channel and/or sensitivity of at least one receiver may be utilised. The information may comprise information about interference per available communication channel and/or access node receiver sensitivity on the available communication channels. Interference may be managed at the device also based on information of at least one of a queue of packets, propagation conditions, load, quality of service, history of allocations, history of collisions, history of retransmissions, history of packet validity timeouts, and number of active devices. A probability of collision and/or transmissions on a communication channel may be estimated. A collision of transmissions may be estimated based on absence of acknowledgement and/or based on a negative acknowledgement of a transmission. Communication channels may be selected based on information from a plurality of access nodes. Communication of information from one or more access nodes and/or monitoring for information from at least one access node can be periodic.

The device may take further into account framing and/or channelization instructions by an access node.

A benefit and cost of using a given communication channel may be determined. The communication channel is selected if the benefit is at least on a predetermined level relative to the cost.

A device and/or access node comprising an apparatus configured to provide at least one of the embodiments can also be provided. The device may comprise a communication device such as a user equipment or another node capable of wireless communication. The access nodes may comprise a base station, a device-to-device node or a relay node.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which:

FIG. 2 shows an example of a communication device

FIG. 3 shows an example of a controller apparatus;

FIG. 4 is a flowchart in accordance with an embodiment;

FIGS. 6A to 6H shown an exemplifying channel allocation scenario; and

Figure 7A:
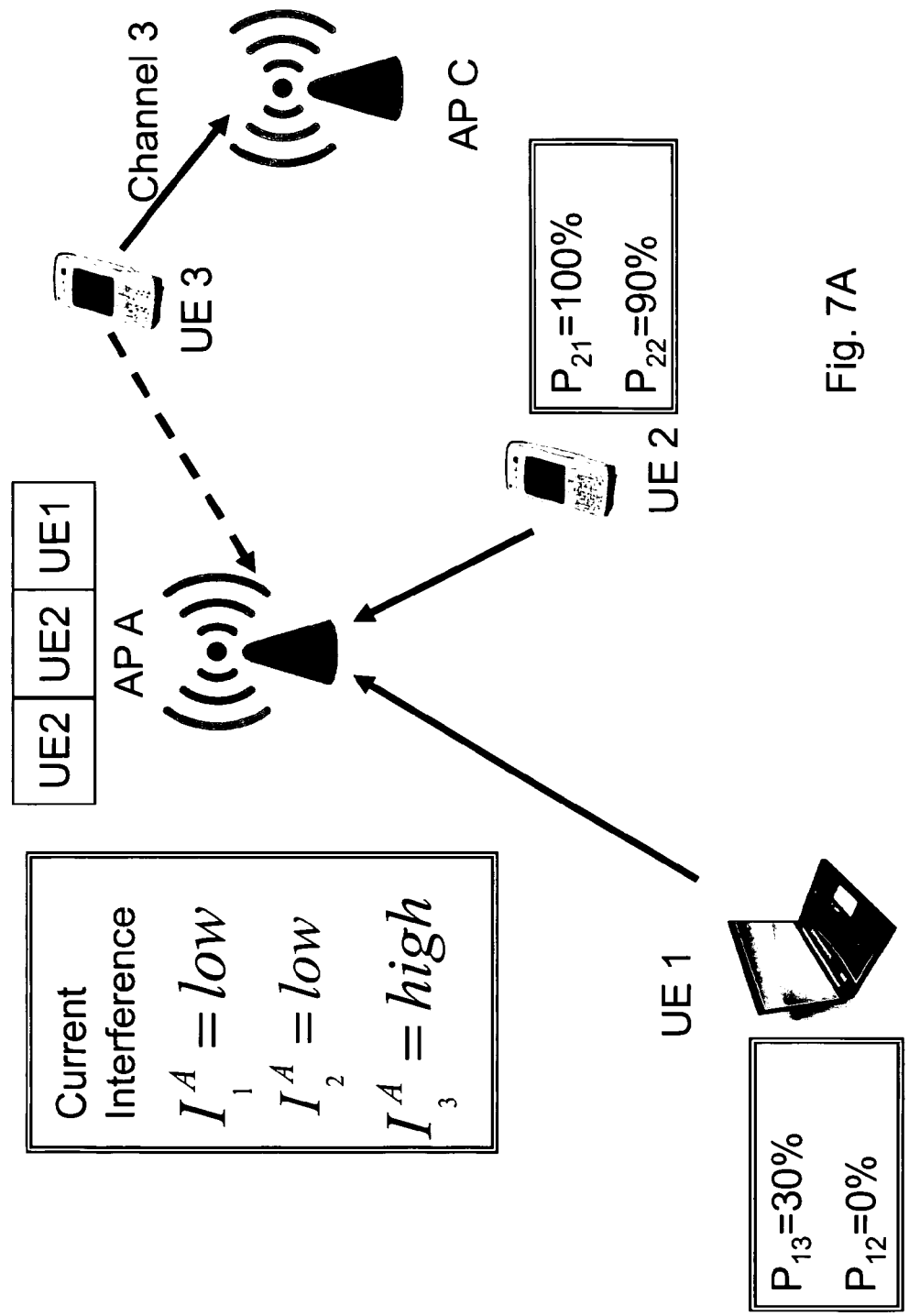
Figure 7B:
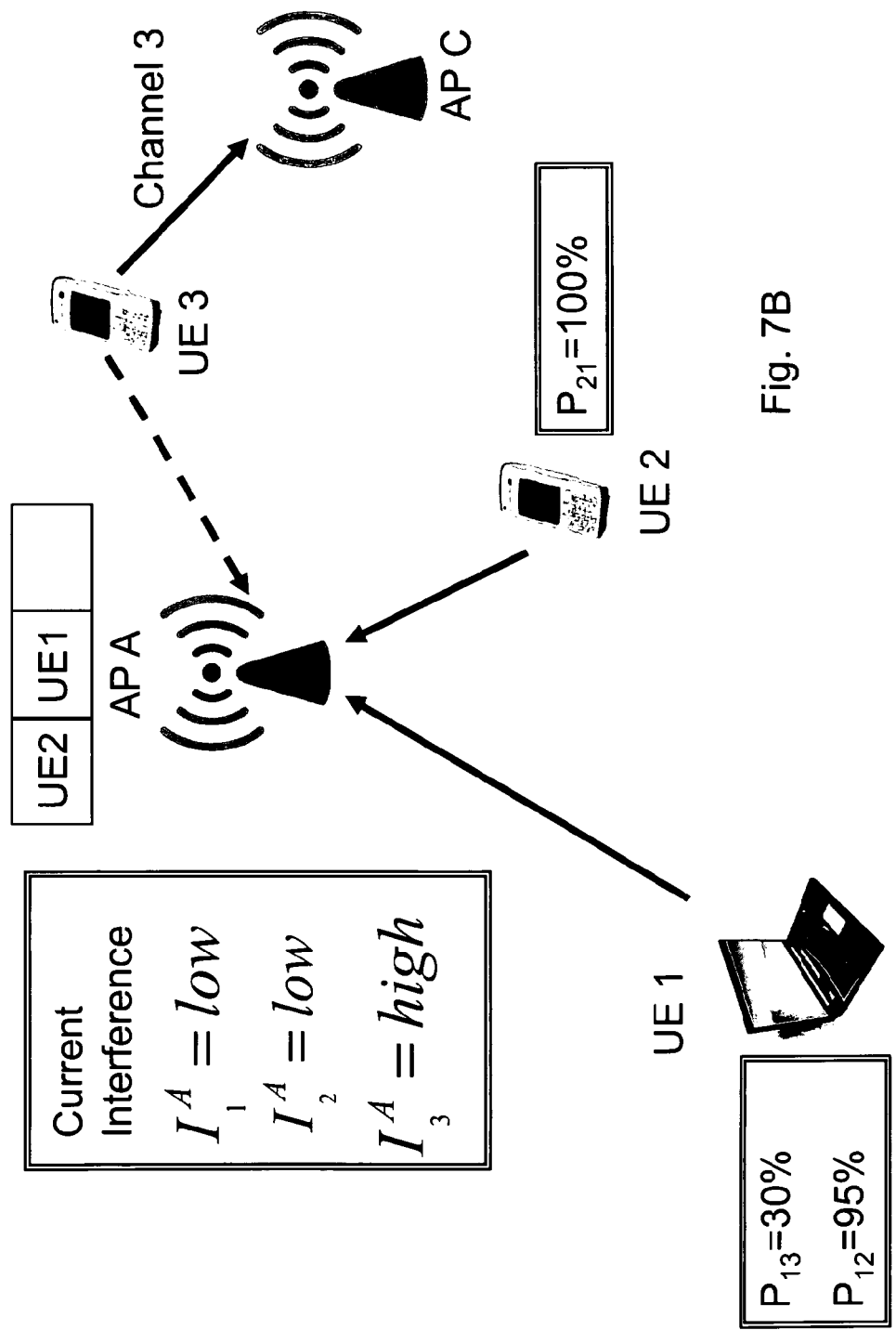

FIGS. 7A and 7B show yet another example.

In the following certain exemplifying embodiments are explained with reference to a wireless communication system serving devices adapted for wireless communication with at least one other node. Therefore, before explaining in detail the exemplifying embodiments, certain general principles of a wireless system, components thereof, and devices for wireless communication are briefly explained with reference to system 10 of FIG. 1, device 20 of FIG. 2 and control apparatus 30 of FIG. 3 to assist in understanding the technology underlying the described examples.

A wireless communication device 20 can be provided with wireless access to a communication system via at least one base station or similar wireless access node. An access node may be provided by any node enabling a wireless device to access a communication network 12. A large number of communication devices, for example user equipments (UEs) 20 may be provided radio access through local wireless access nodes, or access points (AP) 1, 2 or 3. Each of the user equipments can be assigned to an access point. A local wireless access point can be provided by a femtocell base-station 1, a planned relay node 2 or another user equipment 3 which has been appointed by a macro area to act as a local device-to-device (D2D) relay. Such a scenario is illustrated in FIG. 1.

Figure 1:
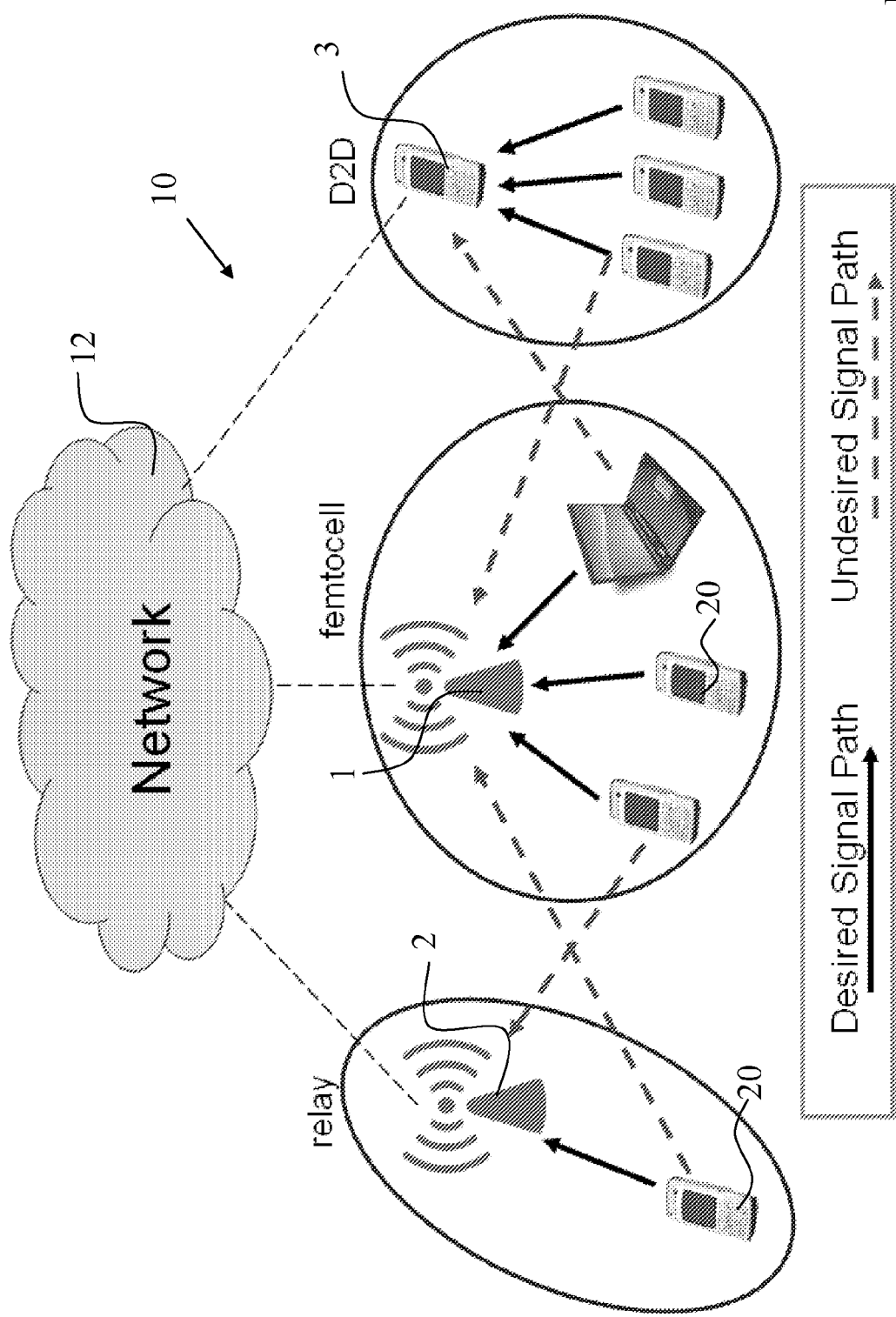
FIG. 1 shows an example of a system wherein below described examples of the invention may be implemented.

In FIG. 1 each access node provides a radio service area. It is noted that a great number of service areas may be provided in a communication system and that a communication device may simultaneously be located in a plurality of service areas. Radio access is controlled by at least one appropriate controller so as to enable operation thereof and/or management of communications by the mobile communication devices. The control apparatus can be interconnected with other control entities. The control apparatus and functions may be distributed between a plurality of control units.

A communication device 20 may further communicate with another device, for example with any of devices 20 or device 3. Each wireless device may receive and/or transmit signals via appropriate apparatus for receiving and/or transmitting signals. The transceiver may be provided for example by means of a radio part and associated antenna arrangement. The antenna arrangement may be arranged internally or externally to the device. A wireless communication device can be provided with a Multiple Input/Multiple Output (MIMO) antenna system.

Devices transmitting to the access nodes can cause interference to other devices and access nodes. The desired signal paths are shown by the solid arrowed lines and the undesired, i.e. interfering signal paths are illustrated by dashed arrowed lines in FIG. 1. It is noted that this is only an illustrative example, and not all possible signal paths are shown.

FIG. 2 shows a schematic, partially sectioned view of a communication device 21 that a user can use for communications. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A mobile device is typically provided with at least one data processing entity 23, at least one memory 24 and other possible components 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26. Control and memory functions provided by the control apparatus of the mobile device in view of channel selection in accordance with certain embodiments of the present invention will be described later in this description.

The user may control the operation of the mobile device by means of a suitable user interface such as key pad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

The device 21 may receive and transmit signals 28 via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

FIG. 3 shows an example of a control apparatus 30 for an access node, for example to be coupled to and/or for controlling a station of a radio service area, for example one of the nodes 1 to 3 of FIG. 1. The control apparatus 30 can be arranged to provide control on measurement, information processing and/or communication operations of an access node. A control apparatus in accordance with FIG. 3 can be configured to provide control functions in association with generation, communication and interpretation of information regarding interference and/or other characteristics relating to the radio channels and/or access control. For providing desired operation, the control apparatus 30 comprises at least one memory 31, at least one data processing unit 32, 33 and an input/output interface 34. Via the interface the control apparatus can be coupled to the relevant node. The control apparatus 30 can be configured to execute an appropriate software code to provide the control functions.

The herein described exemplifying embodiments provide channel selection mechanisms, for example for use in a multiple access mechanism for radio access to an access node by exploiting both the time and the frequency domains. The embodiments are described mainly with reference to a multi-access point multi-user equipment scenario as shown in FIG. 1, but the invention is not limited by this example. The mechanism may provide characteristics such as distributed decisions regarding channels used and allocation of resources, taken by user equipments instead of central controllers such as access nodes, smooth integration with inter-access node (intercell) interference management, higher spectral efficiency compared to simple reuse and random access, faster access in low load compared to scheduled transmissions, and good performance in high traffic loads.

FIG. 4 is a flowchart in accordance with an embodiment. In this embodiment a controller apparatus of an access node determines at 100 suitable information for sending. Messages sent at 102 can comprise various information relating to radio channel conditions at the access node such as, but not limited to information about interference on particular communication channels, access node receiver sensitivity, access node traffic load and so forth. The information can be based on measurements and other data. Said information is sent at 102 to at least one device within the coverage of the access node for use in distributed control of radio access. For example, the node can broadcast the information on a broadcast control channel.

At least one device receives at 104 the information from the at least one node of the system. The device can perform interference management operation at 106 by selecting a set of channels for transmission based on said information. The device can determine at 108 any potential conflicts with other devices, and allocate at 110 communication resources by selecting from said set of channels at least one channel for communication with an access node based on the determination.

The allocation can comprise selection of at least one channel for use for a particular frame. The managing of interference at the device can also take into account information such as queue of packets, propagation conditions, load, quality of service, history of allocations, history of collisions, history of retransmissions, history of packet validity timeouts, number of active devices and so on. It is noted that it is not necessary in all embodiments to receive this information at 104 but it may be obtained otherwise.

The following describes more detailed examples where distributed multiple access is provided based on autonomous decisions by communication devices, such as by a plurality of user equipments. The examples consider transmissions in the uplink, i.e. from communication devices to access nodes. In certain examples the communication devices are referred to as user equipments and the access nodes as access points.

In accordance with an embodiment a wireless access point senses interference levels on available communication channels. The access point can then broadcast to user equipments a metric describing the interference level. Each user equipment can use this information in selection of channels. Thus the interference as detected by an access point can be taken into account in the distributed channel selection process at the user equipment.

In accordance with a possibility a two stage selection procedure is performed by a user equipment. The user equipment can first apply a dynamic resource allocation algorithm, for example a dynamic spectrum allocation (DSA) algorithm that pre-selects a set of channels which are potentially suitable to avoid generating excessive interference to other access points. A dynamic spectrum/channel allocation can define which channels can be used and which channels cannot be used at a particular frame to avoid blocking of other access points on the near vicinity. This functionality can be used to manage outgoing interference, i.e., the undesired signal paths in FIG. 1.

A distributed access control (DAC) function can be used to choose a further subset of the channels selected by the dynamic resource allocation to be effectively used in a particular frame. DAC can be used to manage potential conflicts with other user equipments that may want to transmit to the same access point. The function can be configured to maximize channel utilization and to avoid conflicts in allocation and to manage potential conflicts with other user equipments that want to transmit to the same access point at the same time. In conventional cellular networks a uplink packet scheduler of a base station would provide this functionality. Instead, the DAC aims to achieve similar effect on a distributed fashion. This function can define which channels will be effectively used in a particular frame.

These two functions may be combined in some implementations. DSA and DAC can be implemented as cognitive functions. The learning parameters can be the set of feasible channels and probability of transmission in each channel. DSA and DAC can use information about the quality of service (QoS), the amount of traffic to be served, and the interference levels broadcasted by the access point.

Figure 5:
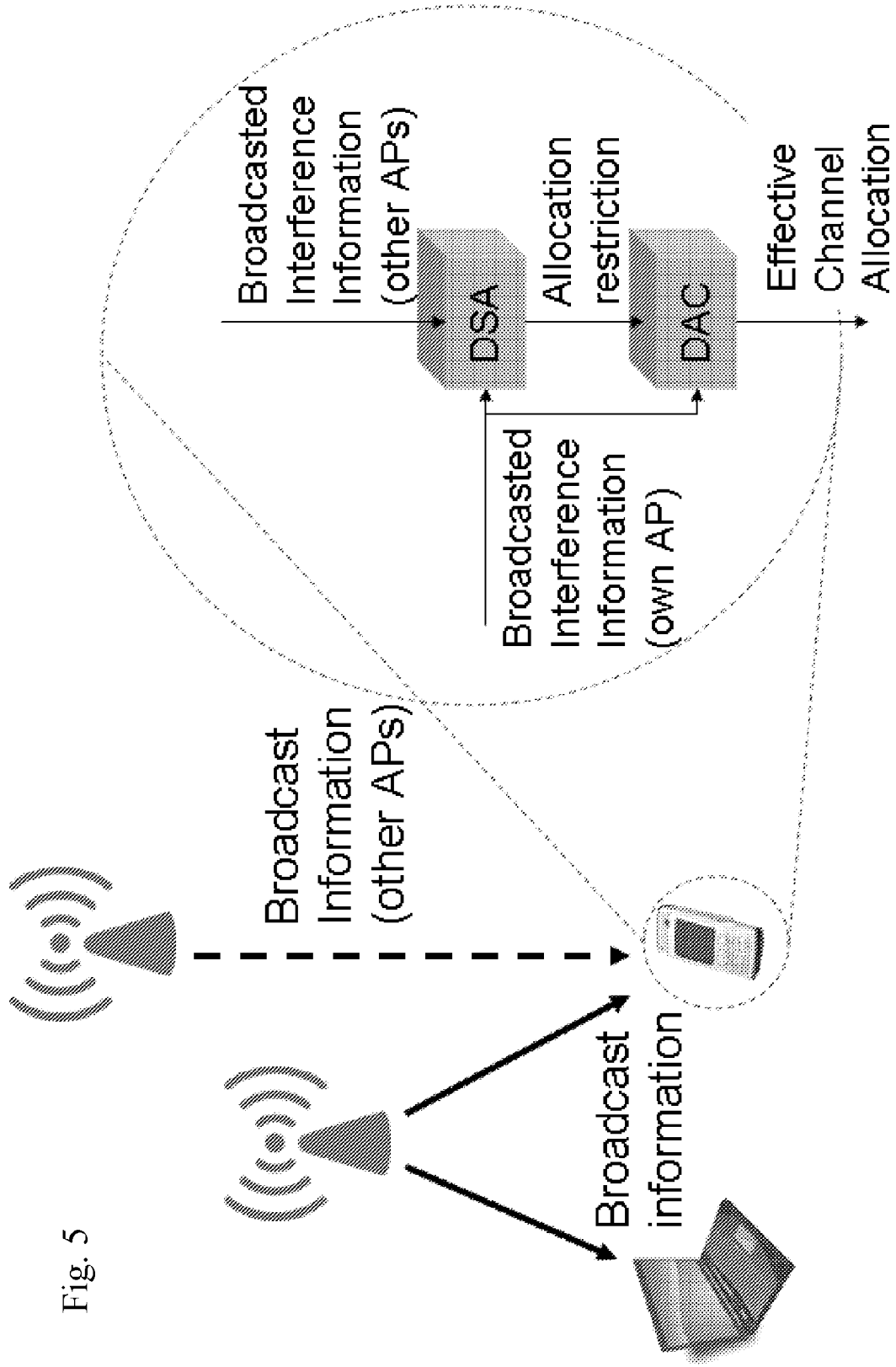
FIG. 5 shows one use scenario.

An example for the interaction between DSA and DAC functionalities is illustrated in FIG. 5. A possible use scenario of the two stage procedure is cognitive multiple access control (MAC) where DSA and DAC functions are implemented as cognitive engines. Another example is access of the user equipment to a D2D master that is connected to a base station. The procedure can also be applied to uplink MAC in cellular and infra-structured networks. According to a possibility the procedure can be used for initial multiple access mechanism for random access procedures in cellular networks.

In accordance with an embodiment one or more channelization methods is used for creating N orthogonal channels. These can be based, for example, on a time division multiple access/orthogonal frequency division multiple access (TDMA/OFDMA) overall communication structure. The channels can be, for example physical resource blocks (PRBs), sub-bands/groups of PRBs, component carriers, time slots. One or more sensing/measurement technique is also provided for measuring the interference levels in each of the N channels. One or more dynamic spectrum allocation technique can be used for selecting appropriate frequency channel candidates. A broadcast or shared control channel is provided that can be used by an access node to send information for the channel selection to all user equipments.

For each of the N channels, the access node can perform measurements to determine the total incoming interference per channel. Total incoming interference can take into account both inter-cell and intra-cell interference and include these in a single metric. That is the information may not need to be available separately.

An access node can have another communication channel that can be used in broadcast mode to send a message to all its affiliated user equipments. Non-affiliated user equipments can also periodically decode this information, should this be desired. An access node can periodically broadcasts, on the additional communication channel, an information element containing information such as the interference per channel within the set of N channels monitored or the ratio of interference/noise in each of the monitored N channels.

The measured interference or interference/noise information can be processed before broadcast. For example, the measurement results can be averaged or filtered, or information of several communication channels can be bundled to reduce signaling overhead on the broadcast or shared control channel.

Each user equipment may define autonomously when to make a transmission. Whilst doing so the framing and channelization imposed by an access point is respected. Therefore, each user equipment defines when and which channels to use. Deciding this channel allocation can be based on various factors. For example, one or more of the following information types can be taken into account: interference measured at the access point side, queue of packets at the user equipment side, radio channel conditions (e.g. based on received power at receiver or other quality metric), traffic load and/or the QoS level, past history of own allocation, past history of collisions and so on. Collision history can be deducted e.g. from the number of ACK/NACK/retransmissions/expired retransmissions and packet validity timeouts.

Performance of the herein described multiple access method may depend heavily on the particular design of the dynamic access control (DAC) and dynamic spectrum allocation (DSA). One implementation example for each of these functions is described next.

A possible solution for the dynamic access control (DAC) can be based on assumption that the following information is available at each user equipment prior to transmission:

Advertised interference value for channel k: $I_k^A$, the estimated or provided receiver sensitivity of the access point: N, and acknowledgment information for the past transmissions received from the user equipment (this information can be, for example, a bitmap or compressed bitmap).

Each user equipment (i) can also be assumed to be aware of the received signal power on access point (A) when the user equipment (i) transmits to access point (A): $S_i^A$.

Each user equipment (i) can then calculate the following metric for each channel k:

$$M_{ik}^{tx} = (1 - \tilde{P}_{ik}) \frac{C_k\left(\frac{S_i^A}{I_k^A + N}\right)}{C_k\left(\frac{S_i^A}{N}\right)} s_{ik} \qquad (1)$$

where $$C_k\left(\frac{S_i^A}{I_k^A+N}\right)$$

is a selected transmission rate, based on the received signal from UE i to AP A ($S_i^A$) and the advertised interference value $I_k^A$, $$C_k\left(\frac{S_i^A}{N}\right)$$

is a transmission rate that would be achievable if interference free transmission was possible, Parameter $\tilde{P}_{ik}$ is an estimated probability of collision on channel k, if UE/node i uses the channel. In other words, $\tilde{P}_{ik}$ is the probability that any other node will transmit channel k, as estimated by node i. For example, $\tilde{P}_{ik}$ can be estimated using statistical inference. Another possibility is that the access point periodically broadcasts the number of active user equipments and/or total offered uplink traffic load, and these metrics are then used by the user equipments in estimating $\tilde{P}_{ik}$. Yet another possibility is that the user equipment uses for $\tilde{P}_{ik}$ a value which is pre-configured and/or broadcasted by the access node. Term $1-\tilde{P}_{ik}$ may be used to provide a long term collision avoidance mechanism.

Parameter $s_{ik}$ can be included to create correlation from frame to frame in the allocated channels and manage collisions, i.e., the future channel allocation is based on the current one. The value can be set to $$s_{ik} = \begin{cases} P_{used}, & \text{if channel } k \text{ was successfully used by } UE\ i \text{ on last frame} \\ P_{collided}, & \text{if channel } k \text{ was used by } UE\ i \text{ on last frame but a collision occured} \\ P_{new}, & \text{if channel } k \text{ was not used by } Tx \text{ on last frame} \end{cases}$$

In the above parameters $P_{used}$ and $P_{new}$ can in general be such that $P_{used}$ is set to a high value (close to 1), whereas $P_{new}$ can be set to a lower value if the method is configured to generate correlated allocations.

$P_{collided}$ provides a mechanism for short-term collision avoidance and may be calculated according to formula:

$$P_{collided} = P_{avoidance}\frac{C_k\left(\frac{S_i^A}{\hat{I}_k^A+N}\right)}{C_{MAX}} \quad (2)$$

Where $P_{avoidance}$ is a parameter, $C_{MAX}$ is the maximum data rate achievable on physical layer, for transmission on a single channel, and $\hat{I}_k^A$ is the interference value prior to the collision, i.e., the assumed value on the original transmission.

A collision is assumed when a user equipment transmits on channel j, but no acknowledgment is received or a negative acknowledgment (NACK) is received. A successful transmission is indicated by positive acknowledgement. Then, the channels are ordered according to metric $M_{ik}^{tx}$. The transmission probability for user equipment j on channel j is calculated as:

$$p_{ik}^{tx}=(M_{ik}^{tx})^{l\alpha} \quad (3)$$

Where l is the order of the channel (according to $M_{ik}^{tx}$ metric), i.e., l=1 for the first channel, 2 for the second channel and so on, and α is a parameter.

It is noted that in this framework $M_{ik}^{tx}$ should always be between 0 and 1.

Equation (3) defines a fairness mechanism which reduces the probability of selecting an additional channel, if one or more channels have already been selected.

Each user equipment can make a binary trial for each channel according to the probability $p_{ik}^{tx}$ in order to decide whether to use a channel or not in a particular frame. The number of channels used for transmission can be limited by the number of packets waiting for transmission.

In accordance with an example the dynamic spectrum allocation (DSA) function is based on a distributed game-theoretic dynamic spectrum allocation method. The method can be based on the iterative optimization of a utility function. Such function may be composed by two addictive terms, a gain function and a tax function. The gain function can provide an estimation of the capacity achievable on a specific spectral channel. The tax function can provide a price to be paid for the usage of that specific channel. The tax function can be composed of terms provided by a weighting function and a wasted capacity function. The weighting function can be used to define fairness in the overall number of channel used and the wasted capacity function can be computed based on interference per noise (I/N) instead of gain (SINR) and defines the amount of capacity which is wasted because of the interference level in a certain channel.

Definition of the utility function allows a trade-off amongst different links or cells. The total utility is the sum of the utility provided by each channel. The utility of a single channel k can be defined as:

$$U_k=C_k-w_kT_k \quad (4)$$

Where $C_k$ is the channel capacity of channel k, $w_k$ is a penalty weighting function, and $T_k$ is a measure of occupancy of the channel by other C-cells.

The algorithm can be configured such that if the benefit of using a channel ($C_k$) is higher than the cost ($w_kT_k$) then the channel can be used. The more channels a user equipment already has allocated, the higher is the penalty that will be applied to access the other channels. This can be used to ensure more fairness amongst the user equipments.

The architecture of FIG. 5 allows for optimization. User equipments can periodically decode broadcast information by other access nodes instead of just the affiliated access node. This enables a user equipment to actively discover its interference influence on neighboring access nodes, making it possible to have efficient implementation of the DSA mechanism. With interference information available from a plurality of access nodes a utility function per channel can be calculated as:

$$U_k = C_k\left(\frac{S_i^A}{I_k^A + N}\right) - w_k\left[\sum_{\forall B \neq A}[T_k(I_k^B) - T_k(I_{k\backslash i}^B)]\right] \quad (5)$$

where $$C_k\left(\frac{S_i^A}{I_k^A + N}\right)$$

is the channel capacity achievable for the link from user equipment (UE) i to access node A. In this example this is explicitly shown as a function of signal-to-noise-plus-interference ratio.

$S_j^A$ is the received signal strength.

$I_k^A$ is the interference value for channel k broadcast periodically by access node A.

N is the receiver sensitivity or noise level per channel, as seen from the access node A.

$I_k^B$ is the total interference including the transmission from node i.

$I_{k\backslash i}^B$ is the interference experienced by access node B, if node i does not transmit.

Then, the potentially usable channels can be passed to DAC function, these channels encompassing channels to which the utility in equation (2) is positive.

Figure 6A:
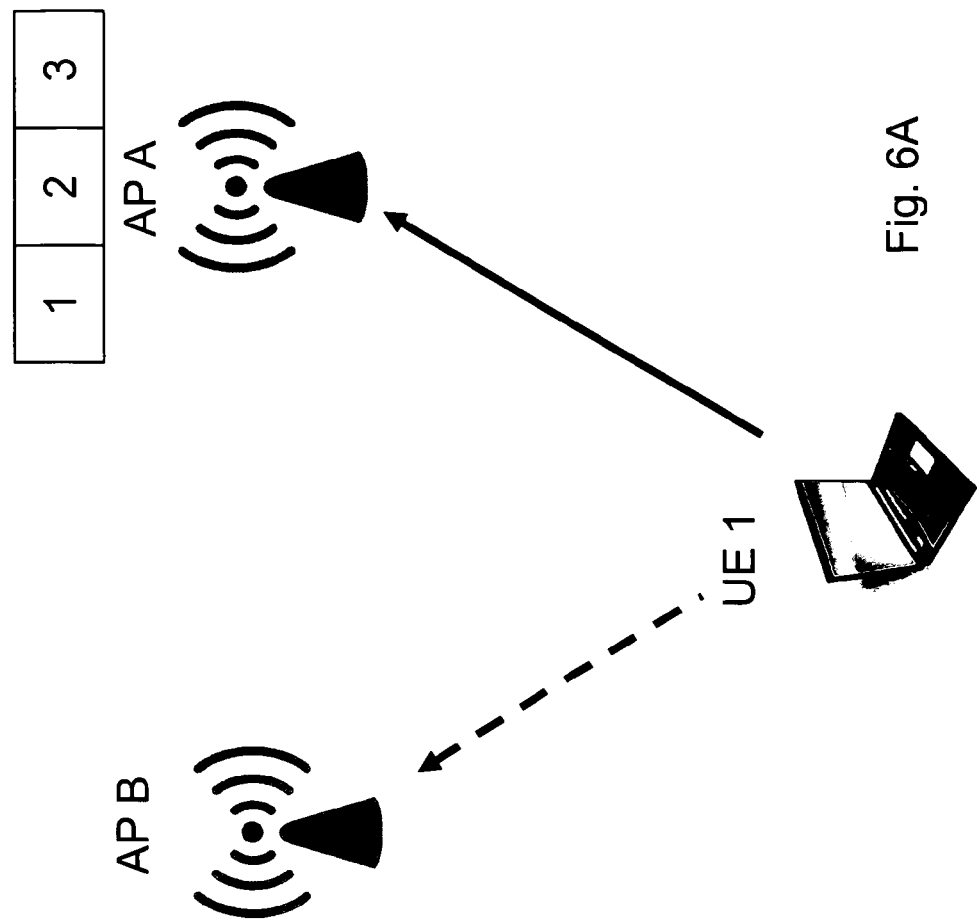
Figure 6B:
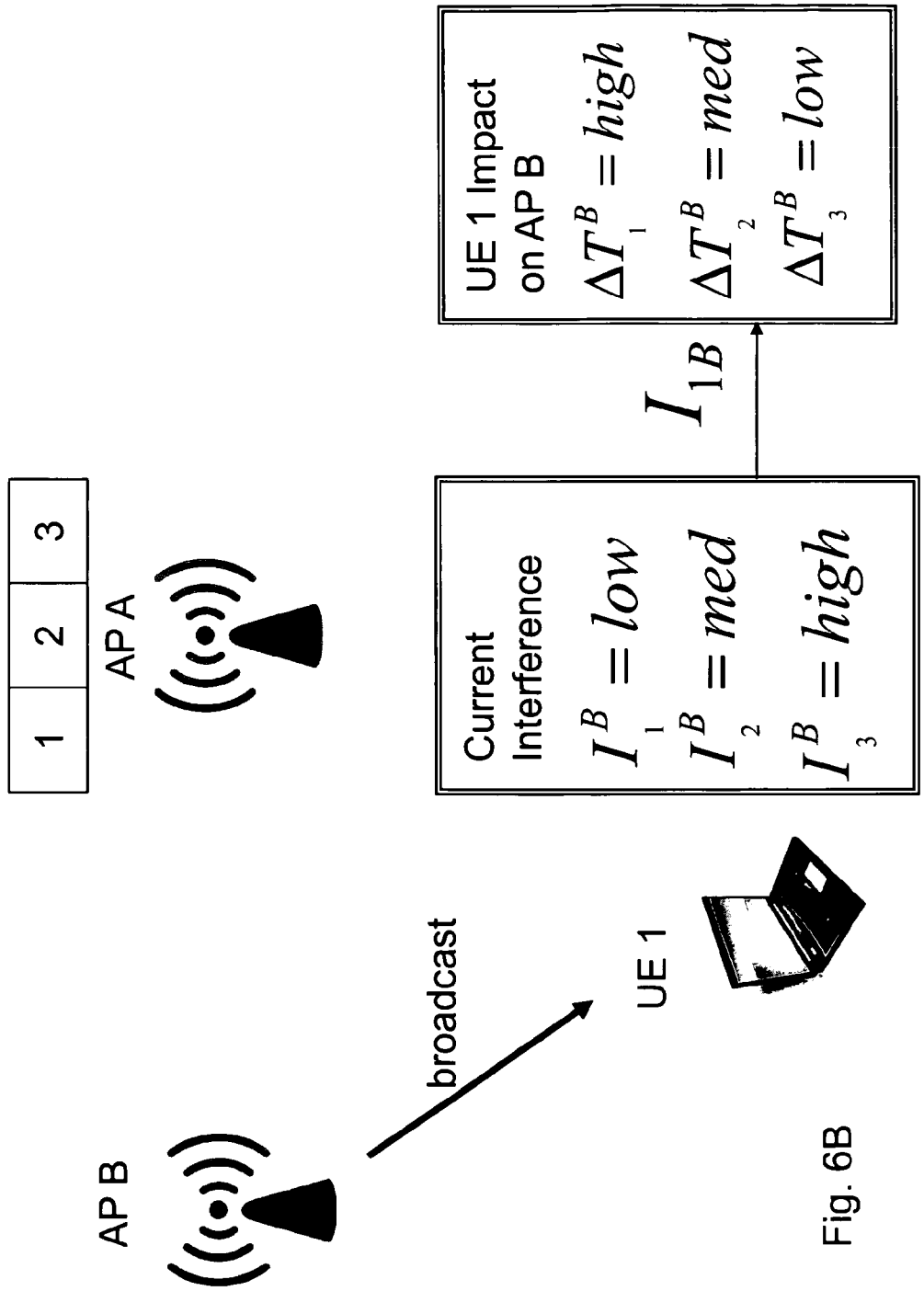

The following explains with reference to FIGS. 6A to 6H an exemplifying scenario where 3 channels are available for access nodes and communicating devices. The solid arrows designate desired signal paths and the dashed arrows designate interference. In the example devices UE1 and UE2 are to have multiple access to an access node, denoted as AP A in the Figures. Another access node, AP B, measures interference generated by device UE1, and determines the interference levels on the channels caused by device UE1. As shown in FIG. 6B, access node AP B broadcasts interference information which is received by device UE1. Device UE1 can separate the information in two parts:

$I_k^B$=interference in access node B when UE 1 transmits; and $I_{k\backslash 1}^B$=interference in access node B when UE 1 does not transmit.

Based on this information device UE1 can then estimate how much interference it generates to access node AP B. FIG. 6B shows the communication device UE 1 determining a the value $I_{k\backslash 1}^B$ shown as the current interference in the left box. Based on the comparison of $I_{k\backslash T}^B$ and $I_k^B$ the communication device UE1 can then calculate its impact on access node B. This can be calculated based on $$\Delta T_k^B = [T_k(I_k^B) - T_k(I_{k\backslash i}^B)] \quad (6)$$

The values of the impact are shown in the right box of FIG. 6B.

Figure 6C:
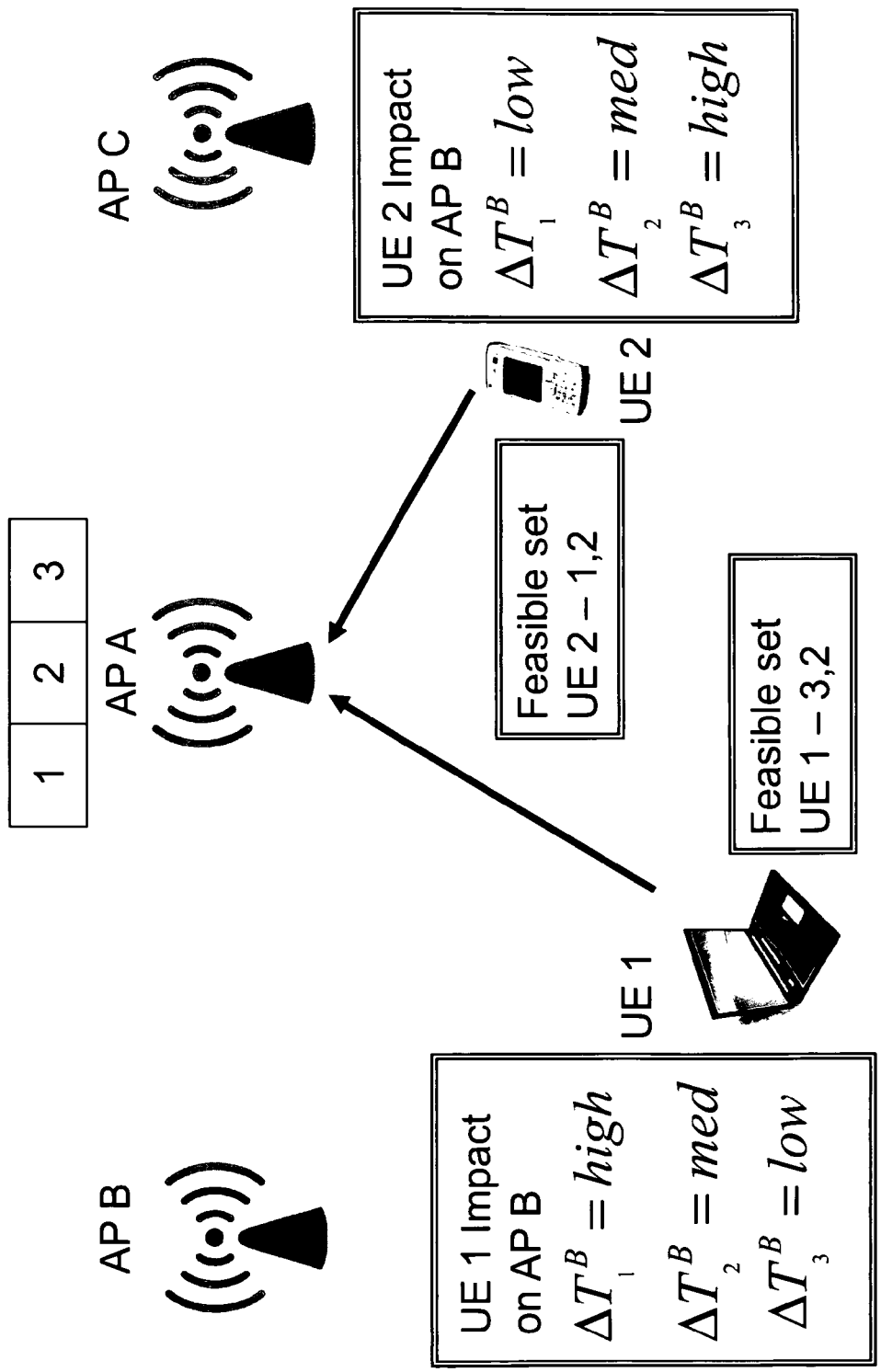

The communication device UE1 aims to avoid unnecessarily high impact to other access nodes. As shown in FIG. 6C, device UE1 can determine that its feasible channel set includes channels 3 and 2. Channel 3 can be considered as being the most preferred since its impact is considered low. Channel 2 is considered as having a medium impact on access node B. FIG. 6C also shows a similar determination by device UE2. A dynamic spectrum allocation algorithm of device UE2 has resulted the feasible set of channels including channels 1 and 2.

Figure 6D:
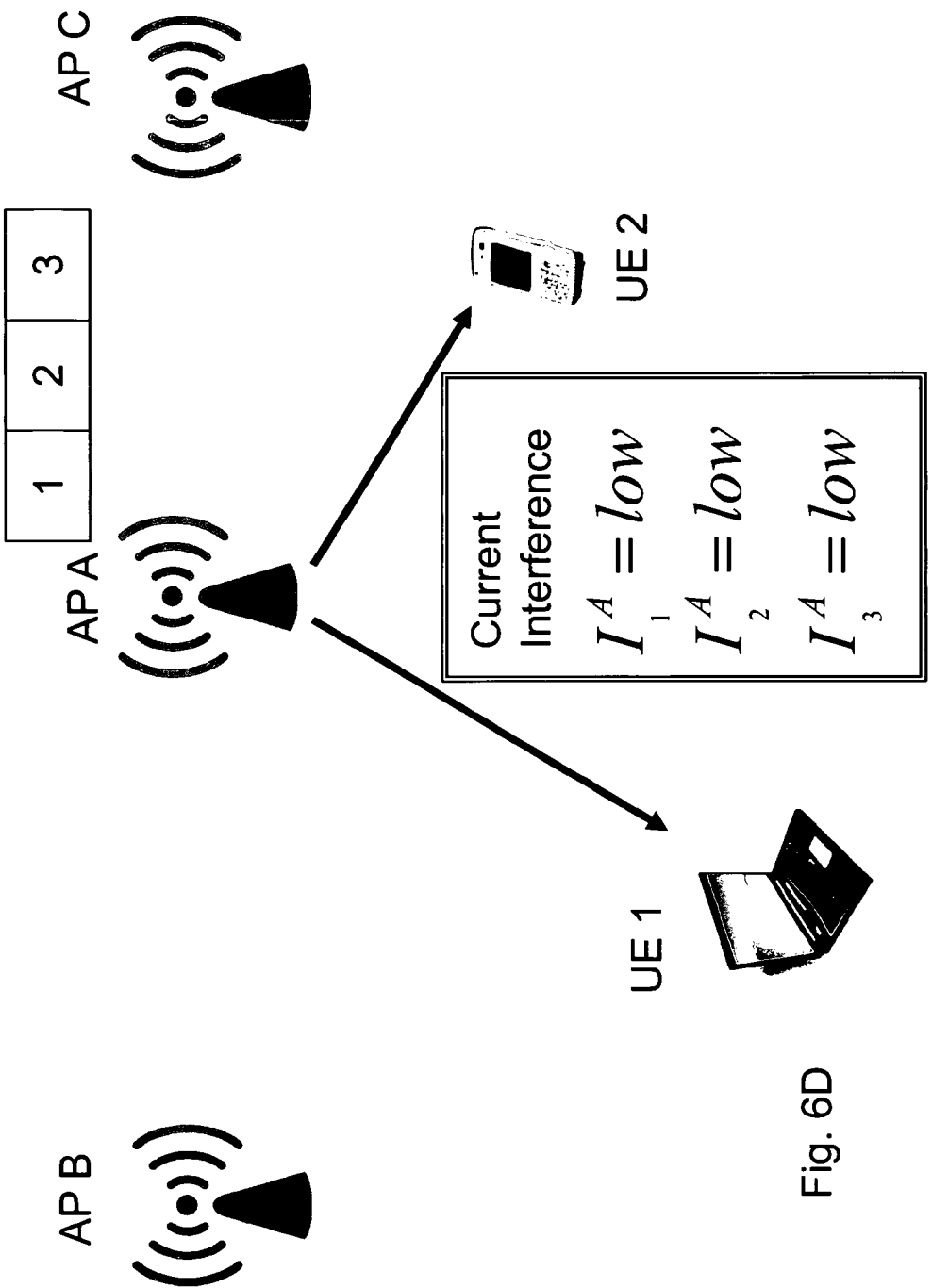

FIG. 6D shows broadcasting of interference information by access node A. As shown, access node A reports low interference on each channel. The information can be collected relatively often by the devices, for example as often as every frame.

Figure 6E:
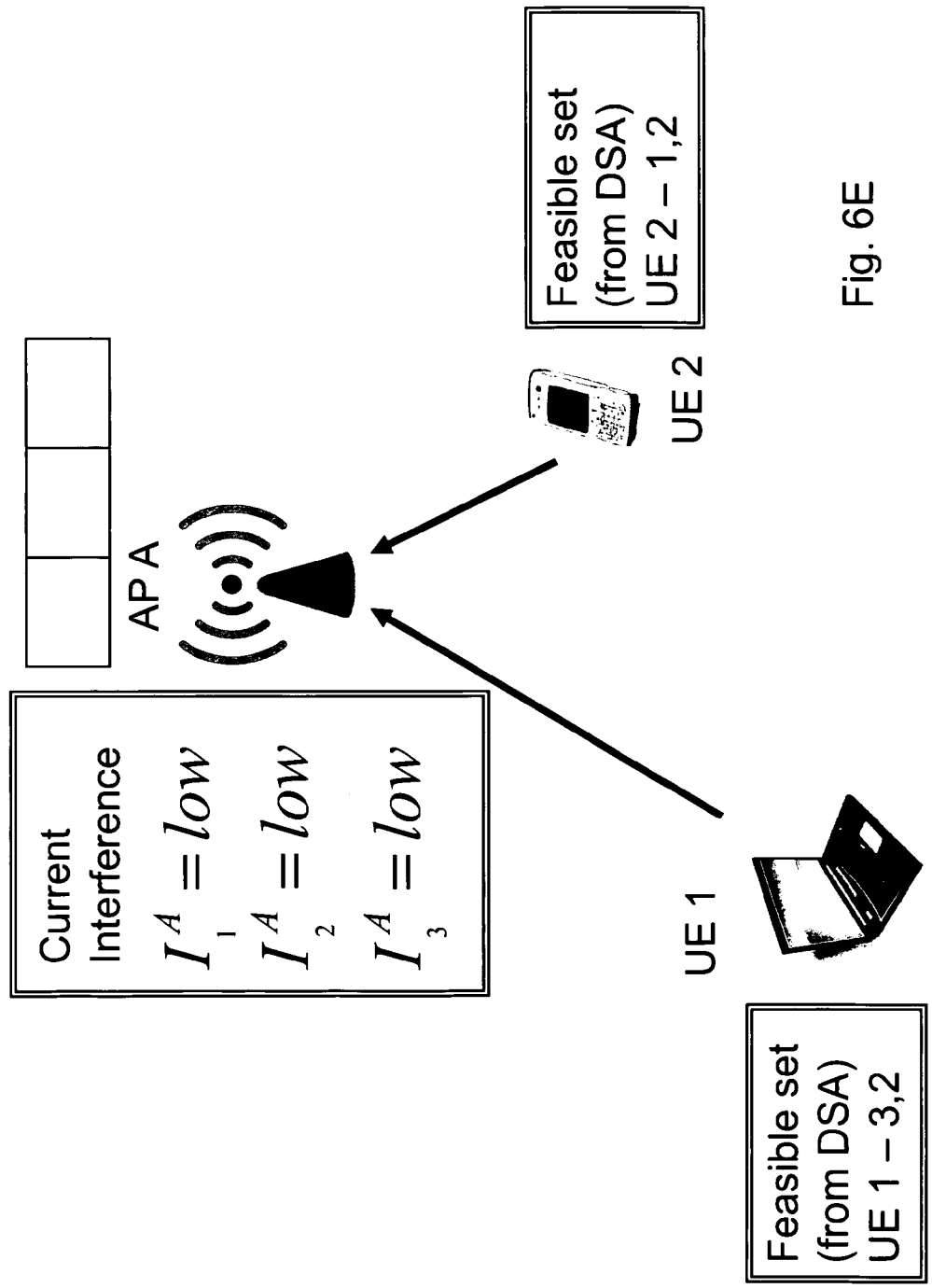

FIG. 6E illustrates the initial state of a channel allocation phase. As shown in FIG. 6D, access node A has reported low interference in each channel. Per FIG. 6C, device UE1 has preliminary selected channels 3 and 2 and device UE2 has preliminary selected channels 1 and 2. However, no channels have yet been allocated.

Figure 6F:
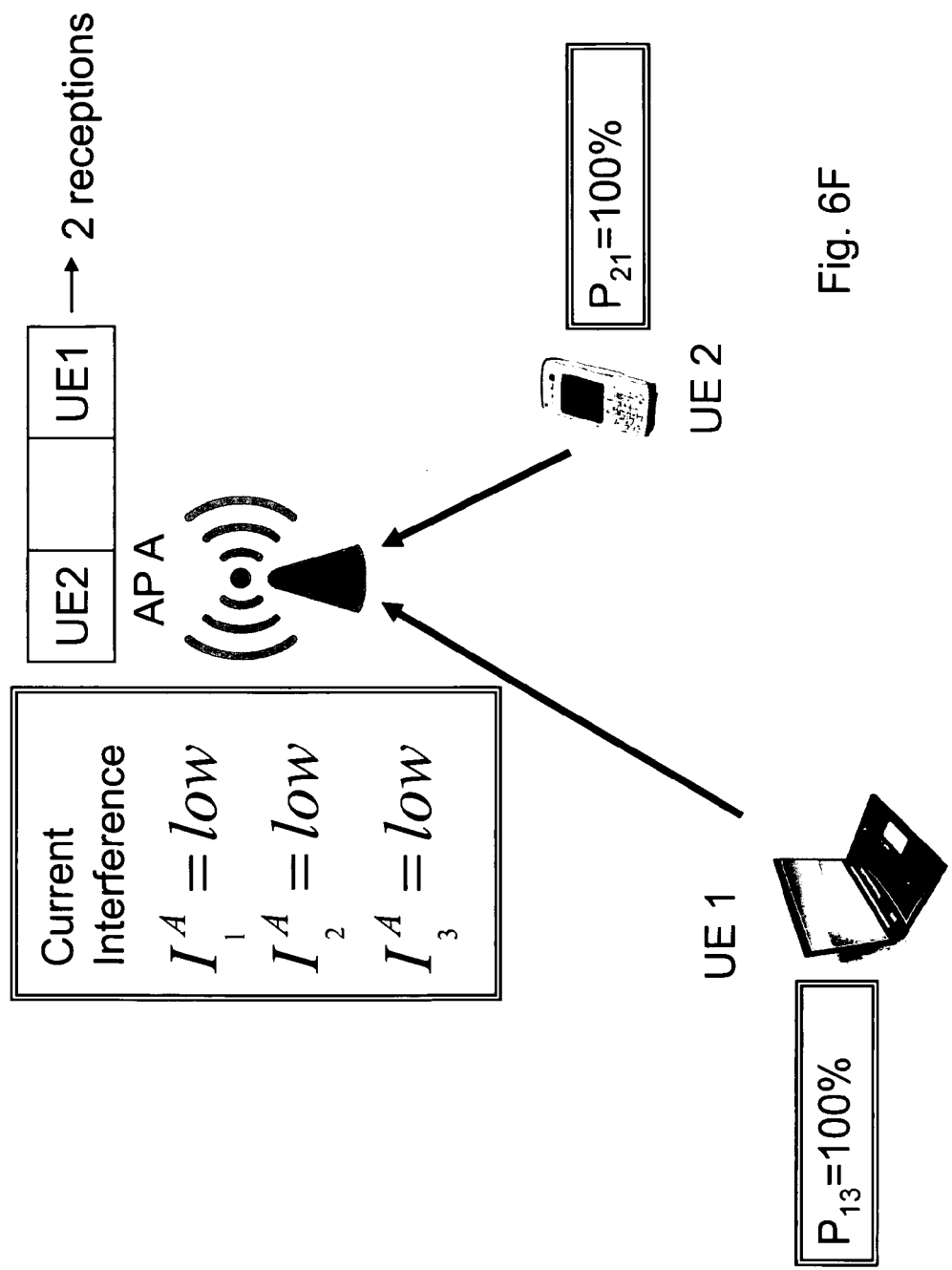

FIG. 6F shows a situation where device UE1 has enough traffic for 1 channel. Considering that channel 3 was determined as being the preferred channel, the probability that device UE1 transmits on channel 3 is 100%. Therefore channel 3 of the available three channels is selected. FIG. 6F also shows that the probability of device UE2 transmitting on channel 1 is also 100%. Therefore channel 1 could be allocated for use by device UE2.

Figure 6G:
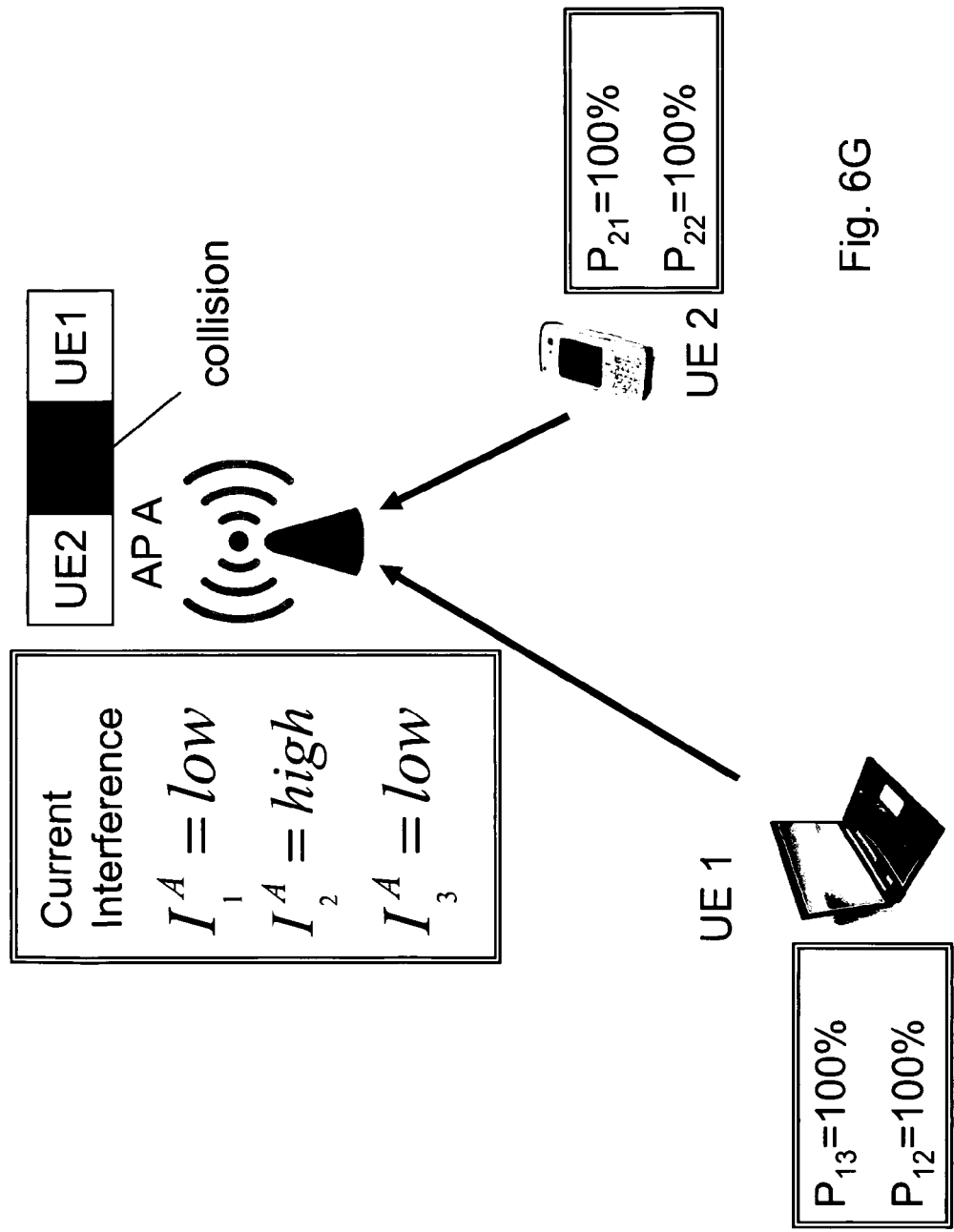
Figure 6H:
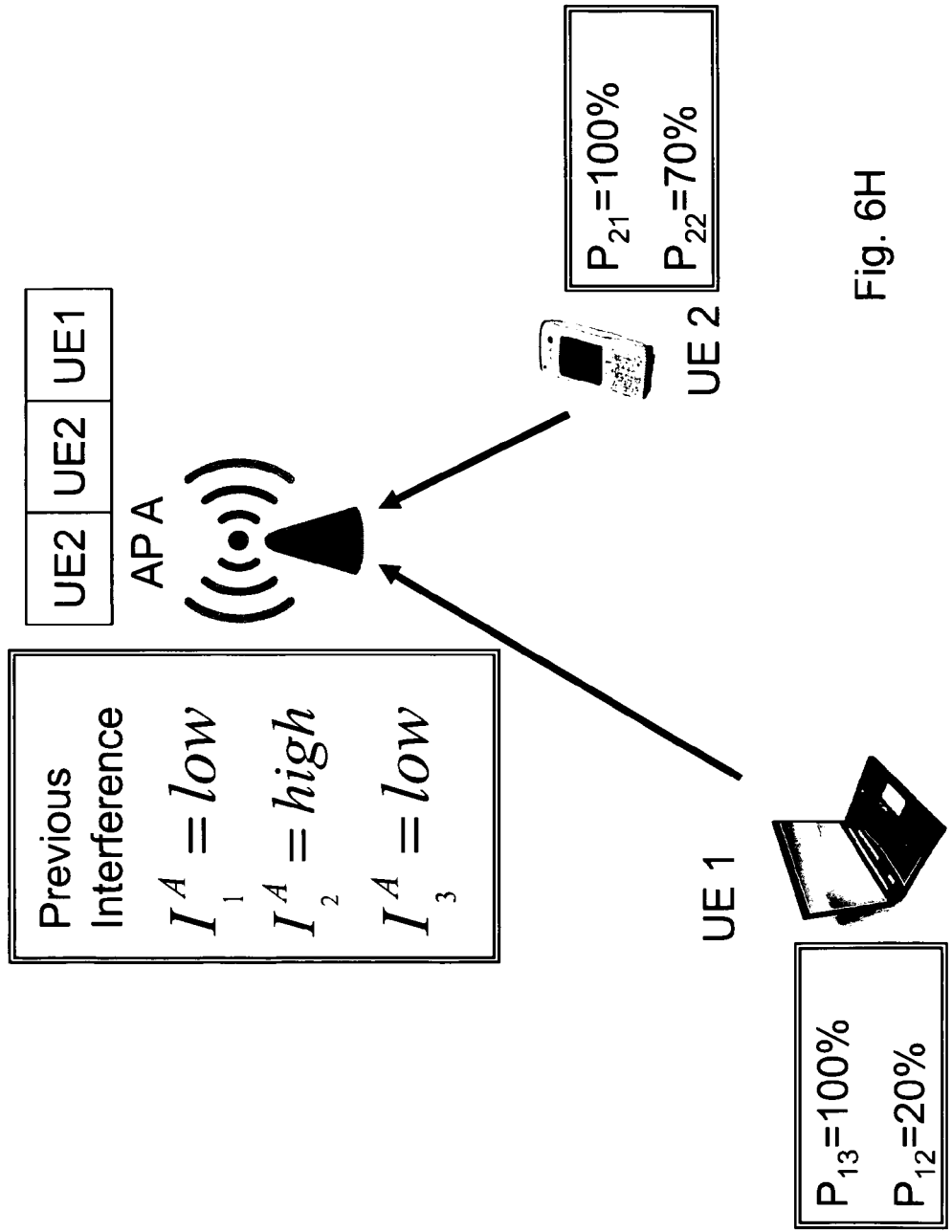

FIG. 6G shows that there is a possibility of collision between the devices on channel 2. Both devices UE1 and UE2 have determined this as a possible channel, and therefore initially the probability of both of them transmitting on channel 2 is 100%. Because of the collision the probability of UE2 transmitting on channel 2 is lowered to 70%. The probability of device UE1 transmitting on the 2nd is lowered even more to 20%. This is due to the fact that device UE1 is considered as being further away from access node A. Based on the probabilities channel 2 is allocated for device UE2.

After the device UE2 has successfully transmitted data from its buffer, the devices can adapt the transmission probabilities again based on the current interference and other information.

FIGS. 7A and B illustrates a scenario where a 3rd communication device, UE3 starts transmission on channel 3 with access node C. As shown, channel 3 therefore experiences high current interference. FIG. 7B illustrates how device UE1 has changed its channel allocation so that it has selected channel 2, thereby avoiding the interference from UE3. It is noted that in this operation device UE1 essentially pre-empts device UE2 from channel 2. This can be seen e.g. from comparison of FIG. 6H with FIG. 7B.

In certain scenarios, for example if there is heavy uplink traffic load, a centralized scheduling may provide a better result. A hybrid implementation may be provided where the uplink frame can be dynamically adapted to use the semi-random mode proposed above or a centralized scheduler. The switching between the scheduling modes can be based on any type and combination of traffic and channel condition metrics estimated by an access node.

The required data processing apparatus and functions of a base station apparatus, a device in a group and any other appropriate node or element may be provided by means of one or more data processors. The described functions at each end may be provided by separate processors or by an integrated processor. The data processors may be of any type suitable to the local technical environment, and may include one or more of general purpose computers, special purpose computers, micro-processors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations of interference and/or other channel conditions, selection and allocation of appropriate channels and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

In accordance with an embodiment a joint flexible spectrum usage and multiple access solution is provided to reduce the effect of complex interference patterns in high density local deployments such as Femtocell or D2D environments. Multiple access complexity can be reduced in an access node by means of a semi-randomized access while higher channel utilization and spectral efficiency may be obtained when compared to traditional random access techniques.

It is noted that whilst embodiments have been described in relation to certain architectures, similar principles can be applied to other communication systems where multiple access may be desired. For example, this may be the case in application where no fixed access nodes are provided but a communication system is provided by means of a plurality of user equipment, for example in adhoc networks. Also, the above principles can also be used in networks where relay nodes are employed for relaying transmissions. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method comprising:
   determining information in relation to radio channel conditions on available communication channels at an access node of a communication system serving a plurality of wireless communication devices by at least one of averaging, filtering, and bundling of the information, wherein the information comprises information relating to a queue of packets, propagation conditions, load, quality of service, history of allocations, history of retransmissions, history of packet validity timeouts, and number of active devices;
   processing the information to create a metric defining interference level at an access node on each available communication channel;
   communicating the metric to one or more of a plurality of wireless communication devices;
   periodically broadcasting the metric from an access node, processing information about interference on at least one communication channel and/or sensitivity of at least one receiver, and
   generating information about interference per available communication channel and/or access node receiver sensitivity on the available communication channels; and
   communicating said information to at least one device within the coverage of the access node for use in the distributed control of radio access at the at least one device.

2. A method according to claim 1, wherein the device comprises a user equipment and the access node comprises a base station, a device-to-device node or a relay node.

3. A method for selecting a set of feasible communication channels for use in selection of at least one communication channel for wireless communication by a device, comprising:
   evaluating interference impact of at least one communication channel on at least one interfered node,
   forming an overall interference effect, and
   selecting the set of feasible communication channels based on comparison of the overall interference effect to communication channel capacity,
process information about interference on at least one communication channel and/or sensitivity of at least one receiver,
   processing information about interference per available communication channel and/or access node receiver sensitivity on the available communication channels,
   determining a collision of transmissions based on absence of acknowledgement and/or based on a negative acknowledgement of a transmission,
   estimating a probability of collision and/or transmissions on a communication channel,
   selecting communication channels based on information from a plurality of access nodes,
   taking into account framing and/or channelization instructions by an access node in channel selection,
   determining a benefit and cost of using a given communication channel and to select the communication channel if the benefit is at least on a predetermined level relative to the cost,
   periodically monitoring for information from at least one access node,
   managing interference based on information of at least one of a queue of packets, propagation conditions, load, quality of service, history of allocations, history of collisions, history of retransmissions, history of packet validity timeouts, and number of active devices, and
   receiving from an access node a metric defining interference level at the access node on each available communication channel.

4. The method according to claim 3, wherein the selecting comprises selection of a set of communication channels by means of dynamic spectrum allocation.

5. An apparatus comprising at least one processor, and at least one memory including computer program code, wherein the at least one memory and the computer program code are configured, with the at least one processor, to
   determine information in relation to radio channel conditions on available communication channels at an access node in a system comprising a plurality of wireless communication devices by at least one of averaging, filtering, and bundling of the information, wherein the information comprises information relating to a queue of packets, propagation conditions, load, quality of service, history of allocations, history of retransmissions, history of packet validity timeouts, and number of active devices;

provide information about interference per available communication channel and/or access node receiver sensitivity on the available communication channels, perform at least one of averaging, filtering and bundling of information before broadcast thereof for distributed channel selection, periodically communicate information from an access node, communicate a metric defining interference level at an access node on each available communication channel, estimate a probability of collision and/or transmissions on a communication channel, and cause communication of said information to at least one device within the coverage of the access node for use in the distributed control of radio access at the at least one device.

6. The apparatus as claimed in claim 5, comprising an access node.

7. An apparatus for selecting a set of feasible communication channels for use in selection of at least one communication channel for wireless communication by a device, the apparatus comprising at least one processor, and at least one memory including computer program code, wherein the at least one memory and the computer program code are configured, with the at least one processor, to evaluate interference impact of at least one communication channel on at least one interfered node, form an overall interference effect, select the set of feasible communication channels based on comparison of the overall interference effect to communication channel capacity, process information about interference on at least one communication channel and/or sensitivity of at least one receiver, process information about interference per available communication channel and/or access node receiver sensitivity on the available communication channels, determine a collision of transmissions based on absence of acknowledgement and/or based on a negative acknowledgement of a transmission, estimate a probability of collision and/or transmissions on a communication channel, select communication channels based on information from a plurality of access nodes, take into account framing and/or channelization instructions by an access node in channel selection, determine a benefit and cost of using a given communication channel and to select the communication channel if the benefit is at least on a predetermined level relative to the cost, periodically monitor for information from at least one access node, manage interference based on information of at least one of a queue of packets, propagation conditions, load, quality of service, history of allocations, history of collisions, history of retransmissions, history of packet validity timeouts, and number of active devices, and receive from an access node a metric defining interference level at the access node on each available communication channel.

8. The apparatus as claimed in claim 7, comprising a user equipment.

* * * * *

UNITED STATES PATENT AND TRADEMARK OFFICE
CERTIFICATE OF CORRECTION

PATENT NO. : 9,326,292 B2
APPLICATION NO. : 14/008107
DATED : April 26, 2016
INVENTOR(S) : Andrea Cattoni et al.

Page 1 of 1

It is certified that error appears in the above-identified patent and that said Letters Patent is hereby corrected as shown below:

On the Title Page, Item 73, the Assignee "Nokia Solutions & Networks Oy" should be deleted and --Nokia Solutions and Networks Oy-- should be inserted.

Signed and Sealed this
Twenty-eighth Day of June, 2016

Michelle K. Lee
*Director of the United States Patent and Trademark Office*